United States Patent [19]
Miyazaki et al.

[11] Patent Number: 5,526,151
[45] Date of Patent: Jun. 11, 1996

[54] METHOD OF MANUFACTURING A PLASMA ADDRESSED LIQUID CRYSTAL DISPLAY DEVICE HAVING PLANARIZED BARRIER RIBS

[75] Inventors: Shigeki Miyazaki; Takahiro Togawa, both of Kanagawa, Japan

[73] Assignee: Sony Corporation, Tokyo, Japan

[21] Appl. No.: 434,863

[22] Filed: May 4, 1995

[51] Int. Cl.⁶ .................................. G09G 3/10; H01J 9/24
[52] U.S. Cl. ............................. 359/87; 359/74; 445/24; 315/169.4
[58] Field of Search .................. 445/24, 25; 359/74, 359/87; 427/66; 315/169.4

[56] References Cited

U.S. PATENT DOCUMENTS

| | | | |
|---|---|---|---|
| 5,116,271 | 5/1992 | Arimoto | 445/24 |
| 5,244,427 | 9/1993 | Umeya | 445/24 |
| 5,349,455 | 9/1994 | Hayashi et al. | 359/87 |

FOREIGN PATENT DOCUMENTS

4-265931  9/1992  Japan.

*Primary Examiner*—William L. Sikes
*Assistant Examiner*—Ron Trice
*Attorney, Agent, or Firm*—Hill, Steadman & Simpson

[57] ABSTRACT

A plasma addressed liquid crystal display device having a plasma cell and a liquid crystal cell stacked one above the other is manufactured by a method of forming stripe-shaped barrier ribs by printing to a substrate on which a plurality of plasma electrodes are previously formed, filling a temporary reinforcing material between each of the stripe-shaped barrier ribs to bury the periphery of the individual barrier ribs, polishing to planarize a top portion of each of the barrier ribs buried in the reinforcing material, removing the temporary reinforcing material to expose the plasma electrodes and finally joining a dielectric sheet in contact with the planarized top portions of the barrier ribs, to assemble a plasma cell. Barrier ribs formed in the plasma cell of the plasma addressed liquid crystal display device can be polished stably with no worry of destruction.

11 Claims, 7 Drawing Sheets

METHOD OF MANUFACTURING A PLASMA ADDRESSED LIQUID CRYSTAL DISPLAY DEVICE HAVING PLANARIZED BARRIER RIBS

BACKGROUND OF THE INVENTION

1. Field of the Invention

The present invention relates to a plasma addressed liquid crystal display device having a plasma cell and a liquid crystal cell stacked one above the other by way of a dielectric sheet. More specifically, it relates to a method of manufacturing a plasma cell by using a screen printing process.

2. Description of Related Art

Figure 7:
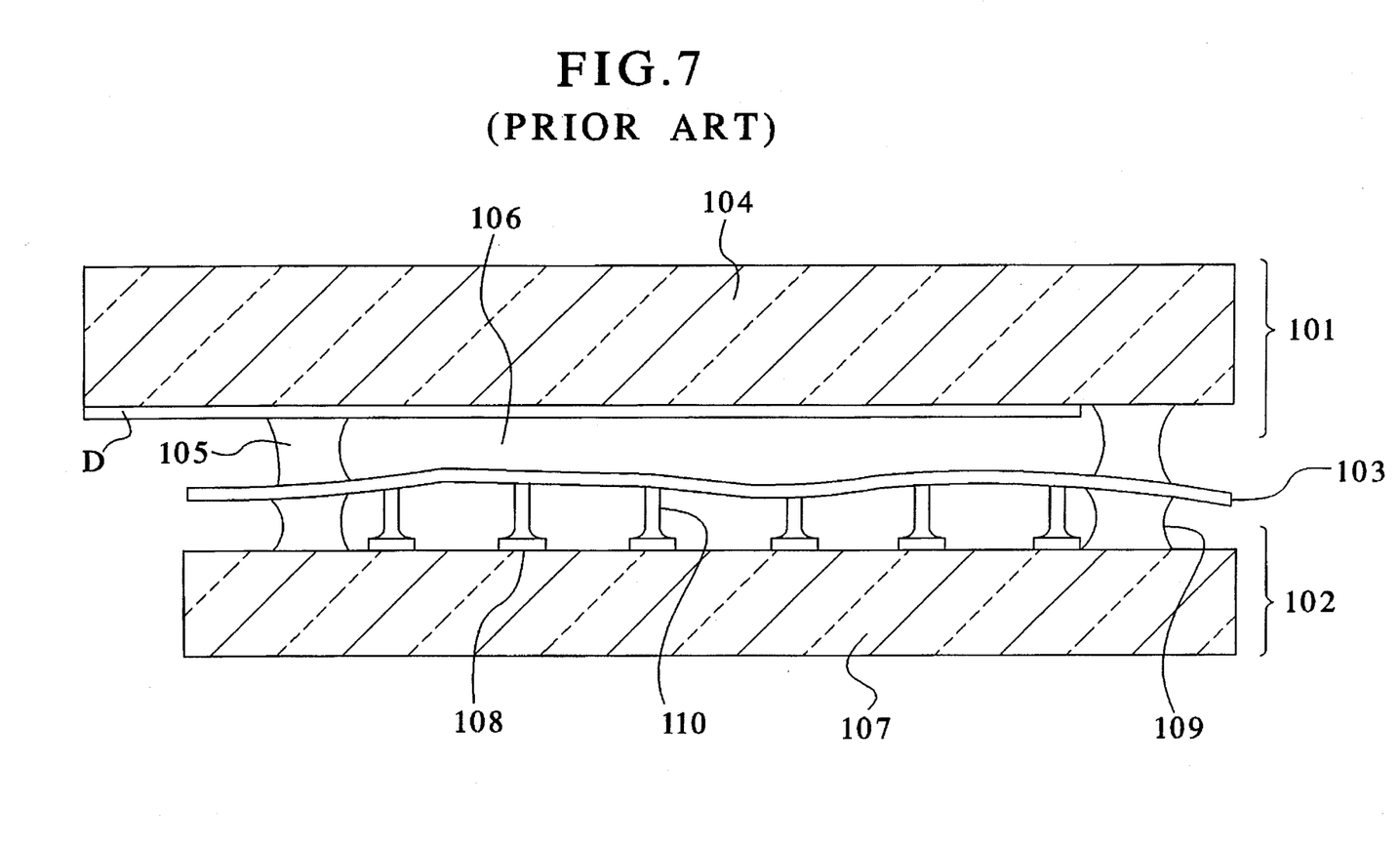
FIG. 7 is a cross sectional view illustrating a plasma addressed liquid crystal display device of the prior art.

A constitution of a plasma addressed liquid crystal display device will be explained briefly with reference to FIG. 7. The plasma addressed liquid crystal display device is disclosed, for example, in Japanese Patent Laid-Open Hei 4-265931. As illustrated in the figure, the plasma addressed liquid crystal display device has a structure comprising a lamination of a liquid crystal cell 101, a plasma cell 102 and a dielectric sheet 103 interposed between both of them. It is necessary that the dielectric sheet 103 is as thin as possible for driving the liquid crystal cell 101, and an extremely thin plate glass with a thickness of about 50 μm is used. The liquid crystal cell 101 is constituted within an upper glass substrate 104 and signal electrodes D are formed in a stripe pattern on the main inner surface thereof. The substrate 104 is bonded to the dielectric sheet 103 at a predetermined gap using spacers 105. A liquid crystal layer 106 is filled in the gap. The gap has a size of usually of about 5 μm, which has to be kept uniformly over the entire display surface.

On the other hand, the plasma cell 102 is constituted with a lower glass substrate 107. A plurality of plasma electrodes 108 are formed in a stripe pattern on the main surface of the glass substrate 107. The glass substrate 107 is joined by way of a frit seal member 109 to the dielectric sheet 103. An ionizable gas is sealed in a space sealed by the frit seal member 109. A barrier rib 110 is formed on each of the plasma electrodes 108 by means of a screen printing process. The plasma cell 102 is divided by barrier ribs 110 into a stripe shape to constitute electric discharge channels. The screen printing process is a simple technique capable of forming a fine pattern and remarkably improving the productivity and the working efficiency.

By the way, while the barrier ribs 110 are formed by screen printing, they require a considerable thickness since they function as a gap spacer for the plasma cell 102. However, the height of the barrier ribs 110 varies, and unevenness such as screen mesh residue is also caused to the top portion of individual barrier ribs. Accordingly, in a state where the top portion of the barrier ribs 110 and the dielectric sheet 103 made of extremely thin plate glass are in contact with each other, undulation is caused to the surface of the dielectric sheet, so that flatness can not be maintained. As a result, the thickness of the liquid crystal layer 106 on the side of the liquid crystal cell 101 can not be controlled uniformly to remarkably deteriorate display quality. In addition, the distance of the gap also varies between the lower glass substrate 107 and the dielectric sheet 103, failing to obtain uniform plasma discharge.

In view of the above, it has been adopted a countermeasure of previously printing and baking the barrier rib 110 to a somewhat larger thickness and then subsequently planarizing by polishing. However, the barrier rib 110 usually has a width of about 100 μm and a height of 100 to 300 μm. Since the height is larger as compared with the width, the mechanical strength of the rib is weak and, particularly, the end of the barrier rib is fragile. Therefore, when polishing is applied for planarization of the top portion after printing and baking, there is a problem that the barrier ribs are broken or destroyed under the effect of mechanism stresses.

OBJECT AND SUMMARY OF THE INVENTION

It is an object of the present invention, in view of the foregoing technical problem, to provide a method of manufacturing a plasma addressed liquid crystal display device capable of applying a stable polishing treatment to top portions of barrier ribs.

The foregoing object can be attained in accordance with the present invention. Namely, a plasma addressed liquid crystal display device comprising a plasma cell and a liquid crystal cell stacked one above the other by way of a dielectric sheet is manufactured by the following steps. At first, a step of forming barrier ribs is applied by printing them in a stripe pattern on a substrate on which plasma electrodes are previously formed. Then, a temporary reinforcing step is applied by filling a temporary reinforcing material between each of the stripe-shaped barrier ribs to bury the periphery of individual barrier ribs. Successively, a polishing step is applied for planarizing the top portion for each of the barrier ribs by polishing in a buried state. Further, a removing step is applied for removing the temporary reinforcing material to expose the plasma electrodes. Finally, a joining step is applied for joining a dielectric sheet in contact with the planarized top portion of each of the barrier ribs to assemble the plasma cell. Subsequently, the liquid crystal cell is assembled by being stacked on the plasma cell to complete a plasma addressed liquid crystal display device.

More specifically, in the temporary reinforcing step, a temporary reinforcing material may be formed by supplying a UV-ray curable resin to a substrate and then applying a curing treatment. Further, in the removing step, the temporary reinforcing material comprising the UV-ray curable resin may be dissolved in a warm water under stirring. Preferably, in the temporary reinforcing step, the temporary reinforcing material is filled in such an amount corresponding to greater than one-half height for the printed barrier rib and at a level corresponding to less than the amount of polishing the top portion of the barrier rib. Depending on the case, a thermosetting resin such as a water soluble polyethylene glycol can be used instead of the water soluble UV-ray curable resin as the temporary reinforcing material.

According to the present invention, after screen printing the barrier ribs in a stripe pattern and baking them, the temporary reinforcing material is filled before the polishing treatment to bury the periphery of the barrier ribs. This can reinforce the barrier ribs of relatively low mechanical strength, so that they can sufficiently withstand mechanical stresses applied upon polishing. Thus, a high quality plasma cell can be manufactured at a good yield. After the polishing, used temporary reinforcing material is removed to expose the plasma electrodes. As the temporary reinforcing material, a UV-ray curable resin is suitable. Different from thermosetting resins, since it suffers from no substantial deformation upon curing treatment and free from a worry of injuring the barrier ribs. Further, if a water soluble UV curable resin is used, since it can be easily dissolved and removed in a warm water under stirring, it gives no undesired effect on underlying plasma electrodes. Further, a water soluble polyethylene glycol is also suitable to the temporary reinforcing material, which makes the handling more convenient as compared with the case of using the UV-ray curable resin.

DESCRIPTION OF THE PREFERRED EMBODIMENTS

Figure 1A:
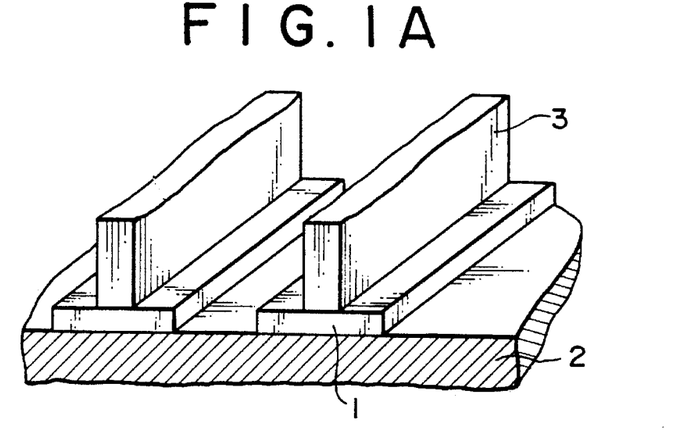
FIG. 1 is a basic step chart illustrating a method of manufacturing a plasma addressed liquid crystal display device according to the present invention.
Figure 1B:
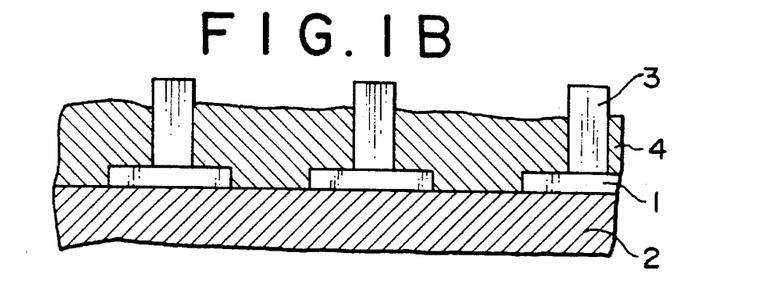
Figure 1C:
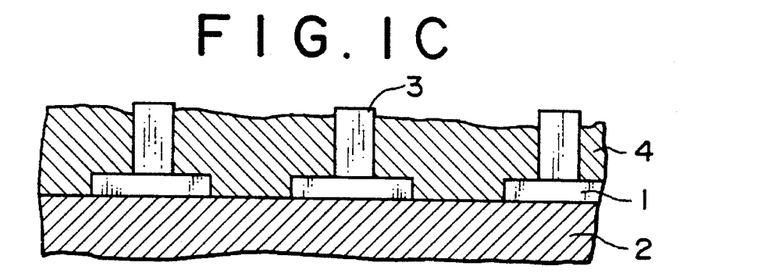
Figure 1D:
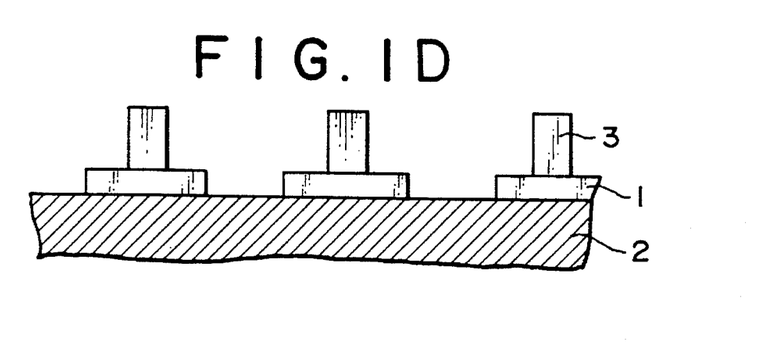

Description will be made specifically to a preferred embodiment according to the present invention with reference to the drawings. FIGS. 1A to 1D are a step chart illustrating a principal portion for a method of manufacturing a plasma addressed liquid crystal display device according to the present invention. At first, a barrier rib forming step illustrated in FIG. 1A is applied. That is, stripe-shaped barrier ribs 3 are formed by printing on a substrate 2 having previously formed plasma electrodes 1. For obtaining a desired height, printing is applied by wet-on-wet coating. However, the height for individual barrier ribs 3 varies to some extent and a trace of screen mesh used for printing is left on the top portion of the barrier rib to cause unevenness. Then, a temporary reinforcing step shown in FIG. 1B is applied, in this step, a temporary reinforcing material 4 is filled between each of stripe-shaped barrier ribs to bury the periphery of the individual barrier ribs 3. Preferably, the amount of the reinforcing material 4 to be filled is determined to such an amount as greater than one-half height of the printed barrier rib 3 and at such a level as less than the amount of polishing the top portion of the barrier rib 3. If the amount of the temporary reinforcing material 4 is less than one-half height of the barrier rib 3, no aimed mechanical strength can be obtained to bring about a worry that the barrier rib 3 is destroyed by polishing in the subsequent step. Further, if the provisional reinforcing material 4 is filled to a level higher than the polishing amount, it may also cause undesired effect on the polishing treatment in the subsequent step. If the surface height of the temporary reinforcing material is predetermined in accordance with the amount of polishing, the end point for the polishing treatment can substantially be detected automatically. In this embodiment, a UV-ray curable resin is used for the temporary reinforcing material 4. Since no heating treatment is required in this instance, the filled temporary reinforcing material causes no volume change and, thus, no undesired mechanical stresses exert on the barrier ribs 3. Then, a polishing step shown in FIG. 1C is applied to planarize the top portion of each of the barrier ribs 3 by polishing. At the same time, the height for each of the individual barrier ribs 3 can also be unified. Finally, the removing step shown in FIG. 1D is applied. Namely, the temporary reinforcing material is removed to expose the underlying plasma electrodes 1. In this case, removal can be conducted extremely easily if a water soluble UV-ray curable resin is used as the temporary reinforcing material. For instance, the UV-ray curable resin is dissolved and can be peeled off extremely easily by dipping into warm water under stirring. By using this method, there is no requirement for particular consideration on the chemical resistance of the plasma electrode or barrier ribs. Subsequently, a joining step is applied by joining the dielectric sheet in contact with the planarized top portion of the barrier ribs to assemble the plasma cell. Further, a liquid crystal cell is assembled on the plasma cell to complete a plasma addressed liquid crystal display device.

Figure 2:
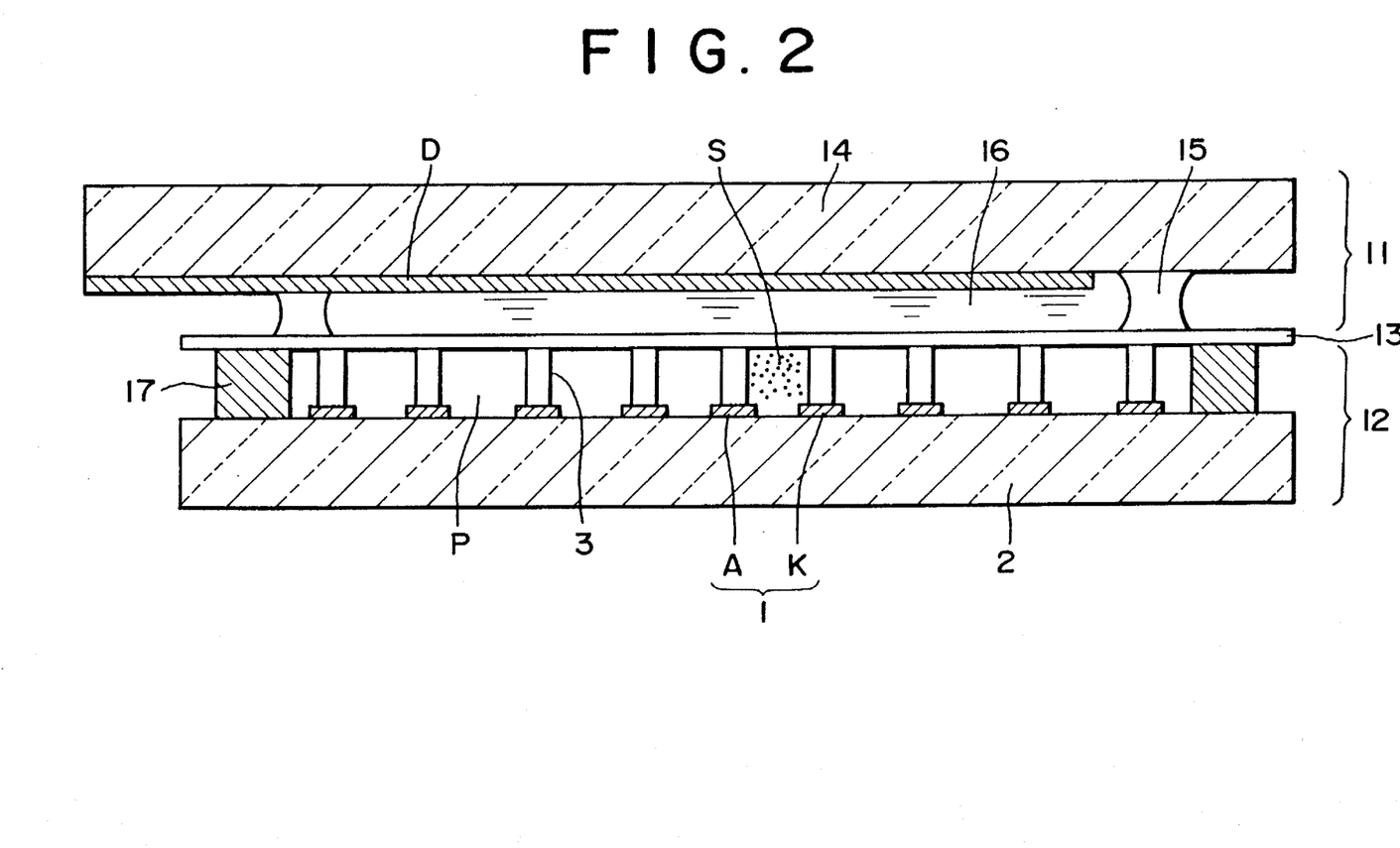
FIG. 2 is a schematic cross sectional view illustrating a plasma addressed liquid crystal display device in a complete state manufactured in accordance with the present invention.

FIG. 2 is a schematic cross sectional view illustrating a plasma addressed liquid crystal display device in a complete state manufactured as described above. In the completed state as illustrated, the plasma addressed liquid crystal display device is formed as a flat panel comprising a lamination of a liquid crystal cell 11, a plasma cell 12 and a dielectric sheet 13 interposed between both of them. It is necessary that the dielectric sheet 13 is as thin as possible for driving the liquid crystal cell and, for example, an extremely thin plate glass of about 50 μm thickness is used. The liquid crystal cell 11 is constituted by using a glass substrate 14, and a plurality of signal electrodes D are formed along the direction of rows on the inner main surface thereof in parallel with each other. The glass substrate 14 is bonded at a predetermined gap to the dielectric sheet 13 using spacers 15. A liquid crystal layer 16 is filled in the gap. The size of the gap is usually about 5 μm and it has to be kept uniformly over the entire display surface. For this purpose, spacer particles having a predetermined grain size are usually scattered in the gap although not illustrated. Further, since the dielectric sheet 13 is supported by the barrier ribs 3 planarized at the surface and made uniform for the height by the polishing treatment, the surface of the sheet is highly planarized. Thus, the size of the gap for the liquid crystal cell 11 can be controlled within an allowance of about ±0.1 μm.

On the other hand, the plasma cell 12 is constituted by using the substrate 2 described above. Plasma electrodes 1 are formed on the inner main surface of the sub-state 2. The plasma electrodes 1 function alternately as anodes A and cathodes K to generate plasma discharge. Since the temporary reinforcing material has been eliminated completely from the surface for each of the plasma electrodes 1, there is no worry of giving undesired effects on electric discharge. The barrier ribs 3 are formed on the plasma electrodes 1. As described previously, the top portion of the barrier rib 3 is planarized by the polishing treatment and in contact with the dielectric sheet 13 to control the size of the gap between the plasma cell 12 and the liquid crystal cell 11 uniformly. A frit seal material 17 made of low melting glass or the like is disposed along the periphery of the substrate 2 to the outside of the barrier ribs 3, to join the dielectric sheet 13 and the substrate 2. A gas-tightly sealed discharging channel P is formed between both of them. An ionizable gas is sealed at the inside of the discharging channel p. Species of the gas can be selected, for example, from helium, neon, argon, xenon or a mixture thereof. When a predetermined voltage is applied between a pair of adjacent plasma electrodes 1, that is, between the anode A and the cathode K, the sealed gas is selectively ionized to form a discharge region S in which the ionized gas is localized. The discharge region S is substantially defined with the barrier ribs 3 to constitute a column scanning unit. An individual picture element is positioned at an intersection between the discharge channel P and the signal electrode D. In this embodiment, the barrier rib 3 is disposed being aligned on the plasma electrode 1 but the present invention is not restricted only thereto. For instance, a pair of plasma electrodes that function as the anode A and the cathode K may be disposed between a pair of barrier ribs adjacent with each other. Depending on the case, the plasma electrodes 1 and the barrier ribs 3 may be disposed in the directions perpendicular to each other to constitute a so-called open cell structure.

Description will be made specifically to an actual embodiment for a method of manufacturing a plasma addressed liquid crystal display device according to the present invention, by way of a flow chart shown in FIG. 3 also with reference to FIG. 4 to FIG. 6. At first, printing for the plasma electrodes is conducted at step S1. For instance, a nickel paste or the like is coated by a screen printing process. Then, the barrier ribs are printed at step S2. A desired height of the barrier rib is obtained also by using the screen printing process and coating a glass paste or the like repeatedly by wet-on-wet coating. It is preferable to set the printing height while previously taking the amount of polishing into a consideration. Then, the printed plasma electrodes and the barrier ribs are baked simultaneously in accordance with a predetermined temperature profile at step S3.

Figure 4:
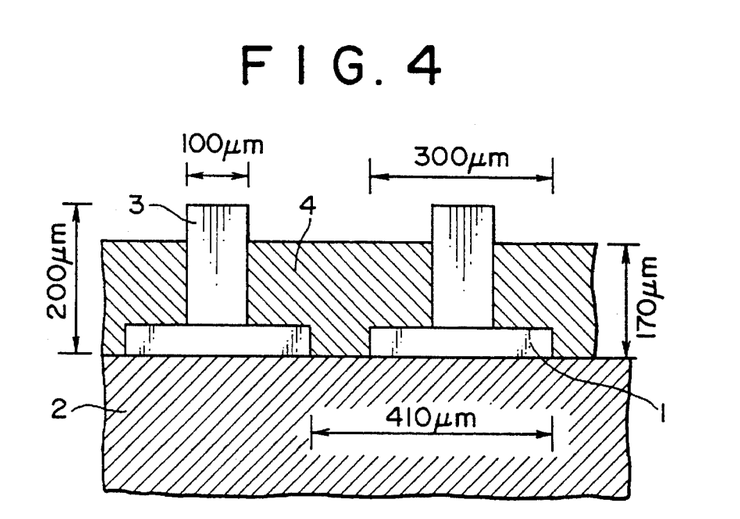
FIG. 4 is an explanatory view illustrating the actual size for the barrier rib and the plasma electrode.

FIG. 4 shows the size of the plasma electrode and the barrier rib in the direction of the height and the width formed in this step. In this embodiment, the plasma electrode has a width of 300 μm and is arranged in a stripe pattern at a pitch of 410 μm. On the other hand, the barrier rib 3 has a width of 100 μm and a height of 200 μm from the surface of the substrate 2 to the top. As described above, since the barrier rib 3 has the height greater than the width and is in the form of a wall, and the mechanical strength is not so large, if the polishing treatment is applied as it is, it may cause breakage or destruction.

Figure 3:
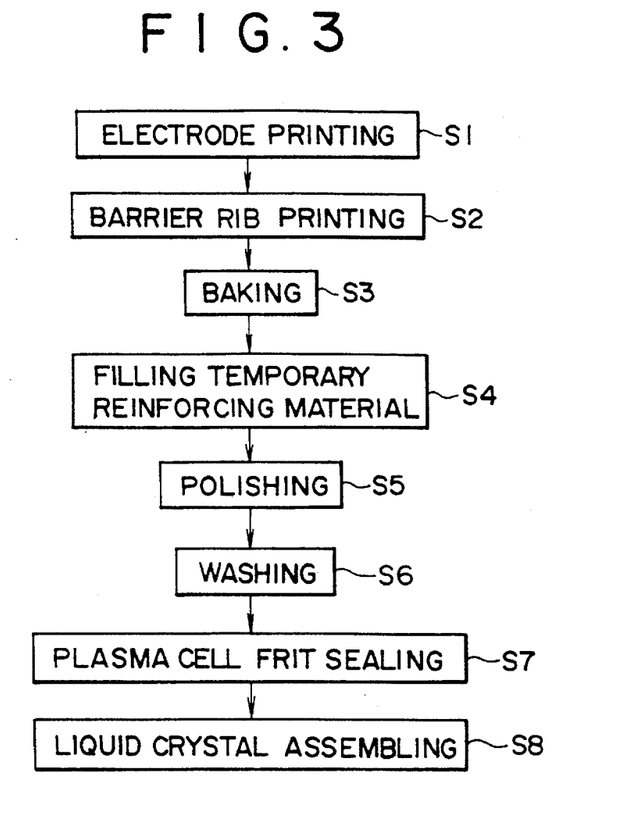
FIG. 3 is a flow chart illustrating an actual embodiment for the method of manufacturing a plasma addressed liquid crystal display device according to the present invention.

Referring again to the flow chart of FIG. 3, the temporary reinforcing material is filled at step S4. In this embodiment, a water soluble UV-ray curable resin (3046B) manufactured by Three Bond Co. is used and spray-coated in an atomized state. Subsequently, UV rays are irradiated for curing. By repeating the coating and the irradiation for several times, the temporary reinforcing material is filled to a level at a height of 160 to 170 μm to bury the periphery of the individual barrier ribs. FIG. 4 schematically shows a relationship between the height of the barrier rib 3 and the level for the height of the temporary reinforcing material 4. The UV-ray curable resin may be coated by a dipping method instead of the spray method. Upon dipping, it is preferred to select the pulling-up direction as a direction perpendicular to the stripes of the partition walls. If the substrate is pulled up in a direction parallel with the stripes, uneven thickness is caused between upper and lower portions.

Then, polishing is applied at step S5. In this embodiment, the polishing treatment was applied by using a single-side polishing machine for use in liquid crystal display device glass substrates (for example, SP-800 manufactured by Speedfan Co.). FIG. 5 shows a perspective outerlooking structure of the single-side polishing machine. A pair of arms 22, 22 are attached on the upper surface of a rotary grinding stone plate 21. A pressing plate 23 is attached to the lower surface of each arm 22. A substrate 2 as an object for polishing is secured to the rear face of the pressing plate 23.

Figure 5:
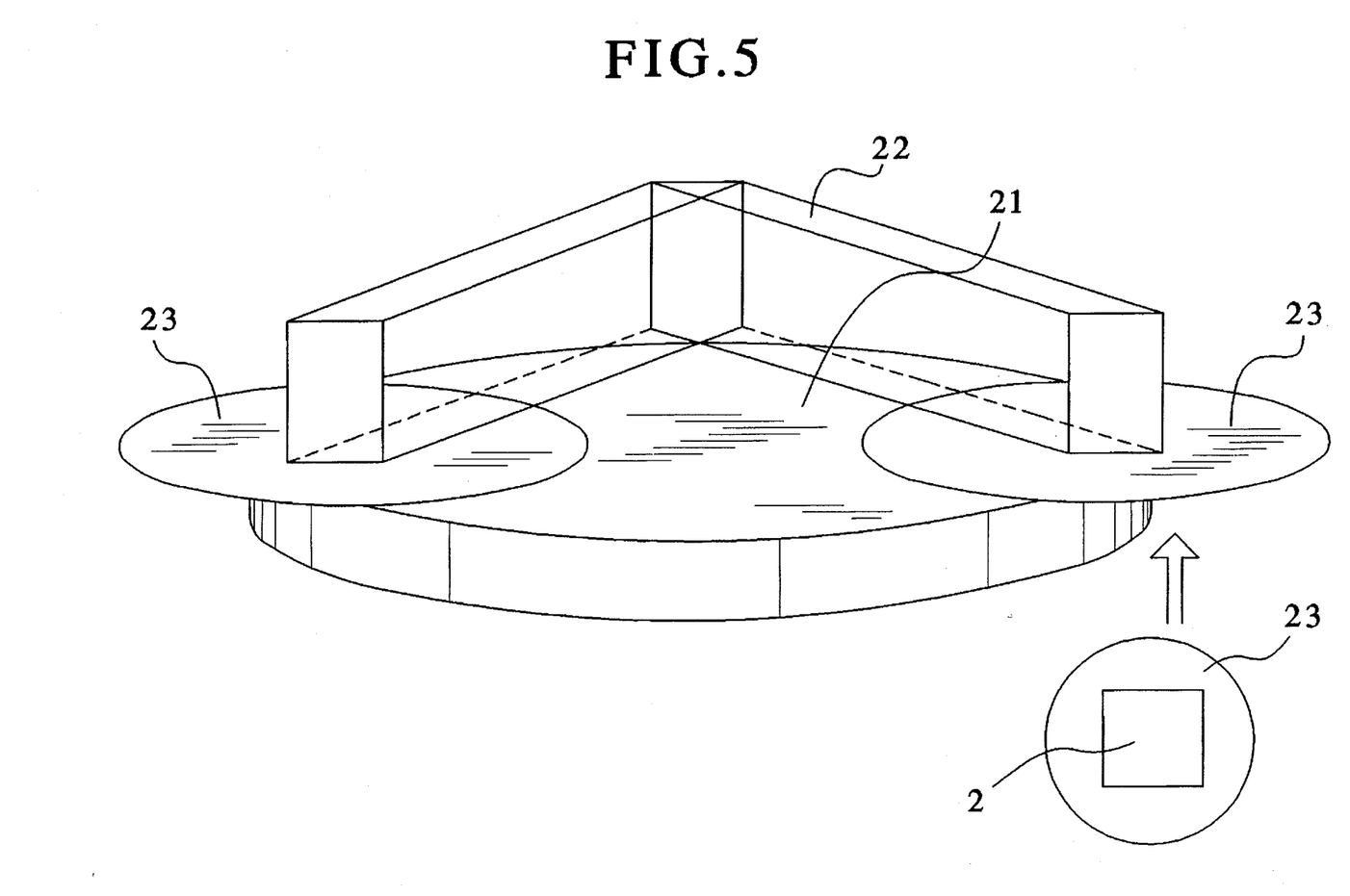
FIG. 5 is a perspective outerlooking view of a single-side polishing machine used for a polishing treatment.
Figure 6:
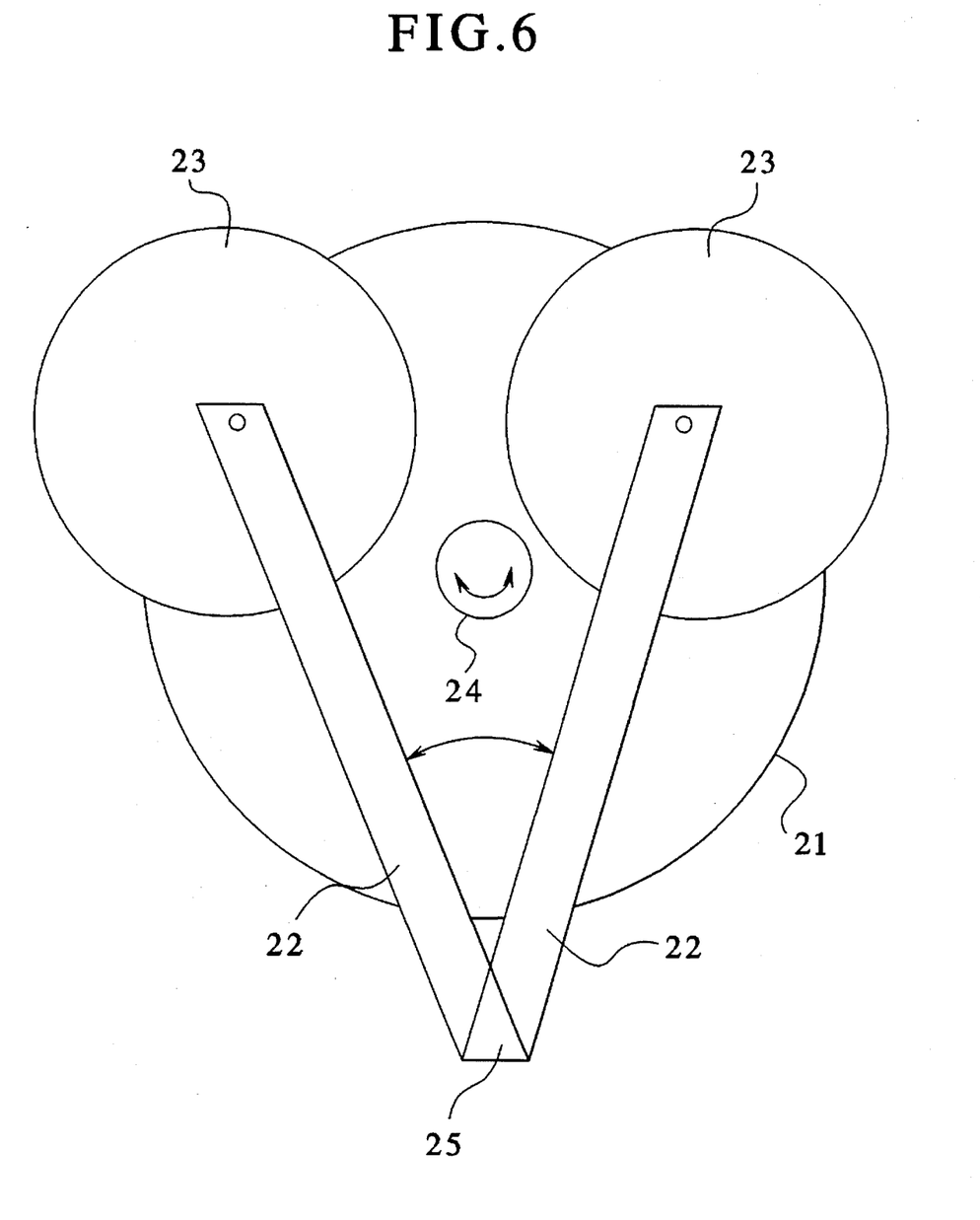
FIG. 6 is a plan view for the single-side polishing machine.

FIG. 6 is a schematic plan view illustrating the polishing operation of the single-side polishing machine shown in FIG. 5. As shown in the figure, the rotary grinding stone plate 21 rotates in both directions around a shaft 24. On the other hand, a pair of arms 22 swing rotatably in the direction in parallel with the rotary grinding stone plate 22. As a result, the top portion of the partition walls disposed on the substrate 2 secured at the rear face of the pressing plate 23 can be polished uniformly. In this embodiment, WA #2000 is used as the polishing member, a pressure of 0.3 kgf is applied to the pressing plate 23, the number of rotation of the rotary grinding stone plate 21 is set to 25 rpm, and the cycle of the swinging movement of the pair of arms is set to 4 rpm. Grinding for the top portion of the barrier rib by about 20 μm can be conducted by applying the polishing treatment for 10 to 15 sec.

Referring again to the flow chart of FIG. 3, the UV-ray curable resin is washed at step S6. Washing is conducted by using a warm water at 80° C. and applying supersonic waves and swinging movement. The UV-ray curable resin can be peeled substantially completely by the washing treatment for about 15 min. Subsequently, the washing solution is replaced from warm water to IPA to remove unevenness in drying. Subsequently, frit sealing is conducted at step S7 to join the substrate after polishing and the dielectric sheet and an ionizable gas is sealed at the inside to assemble a plasma cell. Finally, a liquid crystal cell is assembled on the upper surface of the dielectric sheet to complete a plasma addressed liquid crystal display device.

Figure 8:
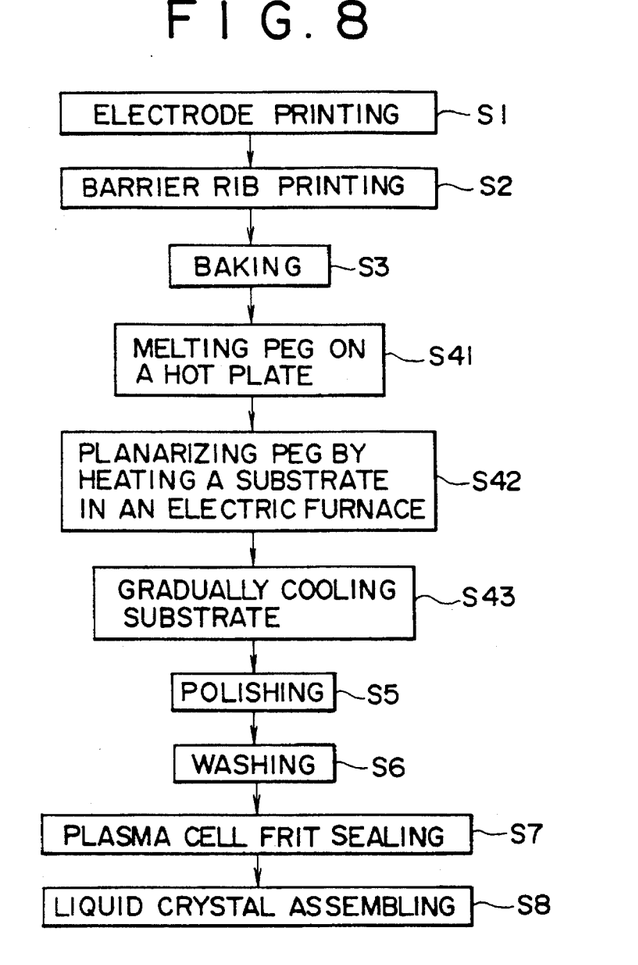
FIG. 8 is a flow chart illustrating another embodiment for a method of manufacturing a plasma addressed liquid crystal display device according to the present invention.

FIG. 8 is a flow chart illustrating another embodiment of manufacturing a plasma addressed liquid crystal display device according to the present invention. This is basically identical with the previous embodiment shown in FIG. 3, except for using water soluble polyethylene glycol instead of the water soluble UV-ray curable resin as the temporary reinforcing material. The material is thermoplastic. At first, printing for plasma electrodes is conducted at step S1. Then, barrier ribs are printed at step S2. Then, the printed plasma electrodes and the barrier ribs are simultaneously baked at step S3. Subsequently, the temporary reinforcing material is filled at steps S41, S42 and S43. In this case, water soluble polyethylene glycol (PEG) is provided as the temporary reinforcing material. For instance, PEG 1540 (trade name of products manufactured by Daiichi Kogyo Seiyaku Co.) can be used. Alternatively, CARBO WAX 1450 (trade name of products supplied from Carbide Chemicals and Plastics Co.) can be used. Both of the materials are thermoplastic having melting temperature at 45° C. to 50° C. and completely water soluble. At first, polyethylene glycol is supplied to the substrate to which the plasma electrodes and the barrier ribs are previously formed at step 41. The substrate is placed on a hot plate, and the supplied polyethylene glycol is melted. Successively, it proceeds to step S42, and the substrate is heated by way of an electric path to planarize the surface of polyethylene glycol. By heating the substrate under the condition that a temperature is higher by about 5° C. than the melting point of polyethylene glycol, the surface of polyethylene glycol in a molten state is planarized under the effect of surface tension. Then, the substrate is gradually cooled at step S43. If the substrate is cooled rapidly, there is a worry of causing cracking in the surface upon solidification of polyethylene glycol. Thus, when the step of filling the temporary reinforcing material has been completed, it proceeds to step S5 and polishing treatment is applied. Then, the water soluble polyethylene glycol is washed at step S6. Subsequently, frit sealing is applied in step S7 to join the substrate the polishing with the dielectric sheet, and an ionizable gas is sealed at the inside to assemble a plasma cell. Finally, a liquid crystal cell is assembled on the upper surface of the dielectric sheet to complete a plasma addressed liquid crystal display device at step S8.

Figure 9:
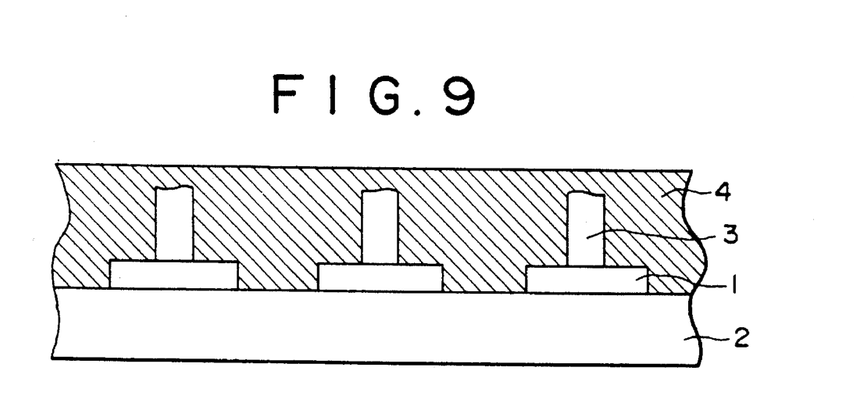
FIG. 9 is a schematic cross sectional view illustrating a state of filling a temporary reinforcing material.

FIG. 9 is a schematic fragmentary cross sectional view illustrating the state of filling the temporary reinforcing material 4 comprising polyethylene glycol. In this embodiment, polyethylene glycol is coated to a considerable thickness so as to entirely cover barrier rib 3. As described previously, since the surface of the reinforcing material 4 comprising polyethylene glycol is planarized, uniform and reliable polishing treatment can be applied. Further, since polyethylene glycol is completely water soluble, it can be removed considerably finely only by the addition of water. Accordingly, no undesired effects are given on the plasma discharge. Different from the case of using the UV-ray curable resin, no special devices such as UV lamps are necessary. Polyethylene glycol itself is chemically stable.

In the two types of the embodiments described previously, the water soluble UV-ray curable resin or the thermoplastic resin such as polyethylene glycol is used as the temporary reinforcing material. An optimum temporary reinforcing material may be selected in accordance with individual manufacturing conditions and it is not restricted in this invention only to the disclosed resin materials. In a case of using the UV-ray curable resin, it should be noted that the peeling amount of the temporary reinforcing material is different depending on the viscosity. If the viscosity is relatively high, the temporary reinforcing material is not dissolved in water but rather tends to be peeled off by water. Therefore, the resin may no more function as the reinforcing material upon polishing. Further, if a viscosity is relatively low, the resin peeled off with water may be solidified, to intake the abrasive upon polishing to possibly damage the barrier ribs. In the case of using polyethylene glycol, it is free from such drawbacks.

As has been described above, according to the present invention, the top portion of the barrier ribs is polished by filling the temporary reinforcing material such as a UV-ray curable resin or polyethylene glycol to thereby enhance the strength, and the barrier ribs of uniform height can be prepared at a good yield by subsequently removing the temporary reinforcing material. The finishing accuracy of polishing (flatness) can be improved and the unevenness in the gap after bonding with the liquid crystal cell can be uniformly controlled to less than 0.1 μm.

What is claimed is:

1. A method of manufacturing a plasma addressed liquid crystal display device having a plasma cell and a liquid crystal cell stacked one above the other, comprising the following steps of:

providing a substrate having a plurality of plasma electrodes;

forming stripe-shaped barrier ribs to said substrate;

filling a temporary reinforcing material between each of the stripe-shaped barrier ribs thereby temporarily reinforcing individual barrier ribs;

polishing a top portion of each of the reinforced barrier ribs to planarize the surface of the barrier ribs;

removing the temporary reinforcing material to expose the plasma electrodes; and joining a dielectric sheet in contact with the planarized top portions of the barrier ribs, to assemble a plasma cell.

2. A method of manufacturing a plasma addressed liquid crystal display device as defined in claim 1, wherein the temporary reinforcing step includes supplying a UV-ray curable resin to the substrate and then applying a curing treatment to form the temporary reinforcing material.

3. A method of manufacturing a plasma addressed liquid crystal display device as defined in claim 2, wherein the removing step includes dissolving the temporary reinforcing material comprising the UV-ray curable resin in warm water under stirring.

4. A method of manufacturing a plasma addressed liquid crystal display device as defined in claim 1, wherein the temporary reinforcing step includes filling the temporary reinforcing material in an amount corresponding to more than one-half of the height of the barrier rib and at a height less than the amount of polishing the top portion of the barrier rib.

5. A method of manufacturing a plasma addressed liquid crystal display device as defined in claim 1, wherein the temporary reinforcing material comprises water soluble polyethylene glycol and is used in the temporary reinforcing step.

6. A method of manufacturing a plasma addressed liquid crystal display device as defined in claim 1, wherein the barrier rib forming step includes forming a barrier rib on each of the plasma electrodes.

7. A method of manufacturing a plasma addressed liquid crystal display device as defined in claim 1, wherein the barrier rib forming step includes forming a barrier rib between a pair of the plasma electrodes.

8. A method of manufacturing a plasma addressed liquid crystal display device as defined in claim 1, wherein the plasma electrodes and barrier ribs are perpendicular to each other.

9. A method of manufacturing a plasma addressed liquid crystal display device as defined in claim 2, wherein the barrier rib forming step uses a printing process.

10. A method of manufacturing a plasma addressed liquid crystal display device as defined in claim 8, wherein the plasma electrodes are formed by the printing process.

11. A method of manufacturing a plasma addressed liquid crystal display device as defined in claim 10, wherein the method further includes a step of baking the plasma electrodes and the barrier ribs simultaneously.

* * * * *